(12) United States Patent
Okuma et al.

(10) Patent No.: US 8,006,198 B2
(45) Date of Patent: Aug. 23, 2011

(54) DISPLAY CONTROL DEVICE, IMAGE PROCESSING DEVICE AND DISPLAY CONTROL METHOD

(75) Inventors: Yumiko Okuma, Nakano-ku (JP); Mahina Nakamura, Musashino (JP); Maki Sato, Yokohama (JP); Tsunehiro Motegi, Shinjuku-ku (JP); Yasutsugu Sasaki, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 779 days.

(21) Appl. No.: 11/736,688

(22) Filed: Apr. 18, 2007

(65) Prior Publication Data

US 2007/0247641 A1 Oct. 25, 2007

(30) Foreign Application Priority Data

Apr. 21, 2006 (JP) ................................ 2006-117754

(51) Int. Cl.
*G06F 3/00* (2006.01)
(52) U.S. Cl. ........ 715/810; 715/834; 715/827; 715/853; 399/81; 399/85
(58) Field of Classification Search .................. 715/834, 715/827, 853; 399/81, 85
See application file for complete search history.

(56) References Cited

U.S. PATENT DOCUMENTS

| | | | | |
|---|---|---|---|---|
| 5,977,974 A * | 11/1999 | Hatori et al. | ................... | 715/839 |
| 6,236,399 B1 * | 5/2001 | Nishiyama et al. | ........... | 715/810 |
| 6,369,833 B1 * | 4/2002 | van Liempd et al. | ......... | 715/700 |
| 6,421,509 B1 * | 7/2002 | Nomura et al. | ................. | 399/81 |
| 6,477,341 B2 * | 11/2002 | Nomura et al. | ................. | 399/81 |
| 6,785,487 B2 * | 8/2004 | Maeda et al. | .................... | 399/81 |
| 6,981,229 B1 * | 12/2005 | Balakrishnan et al. | ....... | 715/863 |
| 7,174,516 B2 * | 2/2007 | Chipchase | .................... | 715/763 |
| 7,266,315 B2 * | 9/2007 | Sato | ............................... | 399/38 |
| 7,363,591 B2 * | 4/2008 | Goldthwaite et al. | ........ | 715/763 |
| 7,404,151 B2 * | 7/2008 | Borchardt et al. | ............ | 715/850 |
| 7,503,016 B2 * | 3/2009 | Hawkins et al. | .............. | 715/864 |
| 2001/0028808 A1 * | 10/2001 | Nomura et al. | ................. | 399/81 |
| 2001/0044585 A1 * | 11/2001 | Dupree et al. | ................ | 600/509 |
| 2004/0090469 A1 * | 5/2004 | Moon et al. | .................... | 345/846 |
| 2004/0201628 A1 * | 10/2004 | Johanson et al. | ............. | 345/764 |
| 2004/0221243 A1 * | 11/2004 | Twerdahl et al. | ............. | 715/834 |
| 2005/0034081 A1 * | 2/2005 | Yamamoto et al. | ........... | 715/810 |
| 2005/0081164 A1 * | 4/2005 | Hama et al. | ................... | 715/830 |
| 2005/0283804 A1 * | 12/2005 | Sakata et al. | .................... | 725/52 |
| 2006/0095864 A1 * | 5/2006 | Mock et al. | ................... | 715/810 |

(Continued)

FOREIGN PATENT DOCUMENTS

JP 06-309135 11/1994

(Continued)

*Primary Examiner* — Ryan F Pitaro
(74) *Attorney, Agent, or Firm* — Turocy & Watson, LLP

(57) ABSTRACT

A technique is provided, which can help the user to know well that process modes have been switched among them, thereby enabling the user to work more efficiently.

A display control device is provided, which comprises: a selection information acquisition unit 201 that acquires selection information representing which process mode has been selected from a plurality of process modes in which different processes are performed; and a control unit 202 that displays display objects corresponding to set items related to the process mode selected, in a first display region on a screen, and display objects corresponding to any process mode not selected, in a second display region narrower than the first display region on the screen, on the basis of the selection information acquired by the selection information acquisition unit 201.

19 Claims, 11 Drawing Sheets

U.S. PATENT DOCUMENTS

| | | | |
|---|---|---|---|
| 2006/0143574 A1* | 6/2006 | Ito et al. | 715/800 |
| 2007/0030362 A1* | 2/2007 | Ota et al. | 348/239 |
| 2007/0079258 A1* | 4/2007 | Hsieh et al. | 715/853 |
| 2007/0089069 A1* | 4/2007 | Hsieh et al. | 715/810 |
| 2007/0113199 A1* | 5/2007 | Lausterer et al. | 715/810 |
| 2007/0247642 A1 | 10/2007 | Nakamura et al. | |
| 2007/0247643 A1 | 10/2007 | Nakamura et al. | |
| 2007/0250785 A1 | 10/2007 | Nakamura et al. | |
| 2007/0250936 A1 | 10/2007 | Nakamura et al. | |
| 2007/0283293 A1 | 12/2007 | Nakamura et al. | |
| 2007/0300187 A1* | 12/2007 | Hama et al. | 715/830 |
| 2008/0022228 A1* | 1/2008 | Kwon et al. | 715/838 |
| 2008/0111826 A1* | 5/2008 | Endrikhovski et al. | 345/582 |
| 2008/0189614 A1* | 8/2008 | Jeong et al. | 715/716 |
| 2008/0307359 A1* | 12/2008 | Louch et al. | 715/835 |
| 2009/0143916 A1* | 6/2009 | Boll et al. | 700/276 |

FOREIGN PATENT DOCUMENTS

| | | |
|---|---|---|
| JP | 07-110754 | 4/1995 |
| JP | 11-134160 | 5/1999 |
| JP | 2001-265558 | 9/2001 |
| JP | 2002-261918 | 9/2002 |
| JP | 2004-029350 | 1/2004 |
| JP | 2005-032239 | 2/2005 |

* cited by examiner

FIG.7

| DISPLAY OBJECT | SELECTION FREQUENCY (TIMES/MONTH) | DEGREE OF RELATION |
|---|---|---|
| ICON 6 0 1 a | 230 | 1 |
| ICON 6 0 1 b | 120 | 2 |
| ICON 6 0 1 c | 68 | 3 |
| ICON 6 0 1 d | 44 | 4 |
| ICON 6 0 1 e | 37 | 5 |

FIG.9

| PROCESS MODE | SELECTION FREQUENCY (TIMES/MONTH) |
| --- | --- |
| BOX | 44 |
| FAVORITE | 37 |
| SAVE | 28 |
| PRINT | 19 |
| COPY | 15 |
| SCAN PREVIEW | 12 |

DISPLAY CONTROL DEVICE, IMAGE PROCESSING DEVICE AND DISPLAY CONTROL METHOD

BACKGROUND OF THE INVENTION

1. Field of the Invention

The present invention relates to an interface screen that displays objects such as characters and icons. More particularly, the invention relates to a technique of controlling the display of display objects on interface screens.

2. Description of the Related Art

Hitherto, to switch one process mode to another on the interface screen (in each mode a specific mode is performed), the user operates hard buttons on the keyboard in most cases. The user pushes a hard button, thus selecting the desired process mode shown in a process-mode menu displayed. Then, the process-mode menu is switched to the initial setting menu for the selected process mode. (See Jpn. Pat. Appln. Laid-Open Publication No. 2002-261918, Jpn. Pat. Appln. Laid-Open Publication No. 2001-265558, Jpn. Pat. Appln. Laid-Open No. 11-134160, and Jpn. Pat. Appln. Laid-Open Publication No. 7-110754.)

On such a conventional interface screen as described above, however, the mode buttons to be selected to switch one process mode to another, have the same size, no matter how important each mode button is or how often it is selected. The user cannot help but read the words or icons displayed on the screen in association with the mode buttons, in order to decide which mode button he or she should select. When the user selects one mode on the conventional interface screen, the screen instantaneously changes to another. Inevitably, the user may fail to determine whether the mode has indeed been switched to the process mode he or she has just selected. To switch a mode to another, the user may depress a hard key to have the top menu of the other mode displayed on the interface screen. In this case, the freedom of user operation is small because of the linear hierarchy of process modes.

Information may be transmitted while it is being copied. In this case, while some setting is being performed in the information-send mode, the conventional interface screen cannot display a message, informing the user that a job is undergoing in the copy mode. Consequently, the user cannot easily know which job is proceeding at present. To confirm whether such works are proceeding in parallel, the user need to switch from one process mode to another, and then to the setting menu dedicated to the other process mode. This is not desirable in view of the efficiency of work.

SUMMARY OF THE INVENTION

An embodiment of the present invention has been made in order to solve the problems described above. An object of this invention is to provide a technique that can help the user to know well that process modes have been switched, thereby enabling the user to work more efficiently.

To achieve the object described above, a display control device according to an aspect of the invention comprises: a selection information acquisition unit that acquires selection information representing which process mode has been selected from a plurality of process modes in which different processes are performed; and a control unit that displays display objects corresponding to set items related to the process mode selected, in a first display region on a screen, and display objects corresponding to any process mode not selected, in a second display region narrower than the first display region on the screen, on the basis of the selection information acquired by the selection information acquisition unit.

An image processing apparatus according to an aspect of the invention comprises: a display control device of a type described above; an input unit that receives operation instructions a user has input on the basis of the items displayed on the display control device; and an image-processing unit that performs an image processing in accordance with the operation instructions received by the operation input unit.

A display control method according to an aspect of the invention is designed for use in a display control device of a type described above. The method comprises: acquiring selection information representing which process mode has been selected from a plurality of process modes in which different processes are performed; and controlling the control unit to display, in a first display region on a screen, display objects corresponding to set items related to the process mode selected, and, in a second display region narrower than the first display region on the screen, and display objects corresponding to any process mode not selected, on the basis of the selection information acquired by the selection information acquisition unit.

Another display control device according to an aspect of the present invention comprises: a selection information acquisition means for acquiring selection information representing which process mode has been selected from a plurality of process modes in which different processes are performed; and a control means for displaying display objects corresponding to set items related to the process mode selected, in a first display region on a screen, and display objects corresponding to any process mode not selected, in a second display region narrower than the first display region on the screen, on the basis of the selection information acquired by the selection information acquisition means.

BRIEF DESCRIPTION OF THE DRAWINGS

FIG. 7 is a table showing the degrees of importance assigned to the icons displayed in the first display region A1 when the copy mode is selected;

FIG. 9 is a table showing the frequencies at which process modes have been selected after the "send mode" has been selected;

DESCRIPTION OF THE EMBODIMENTS

Figure 1:
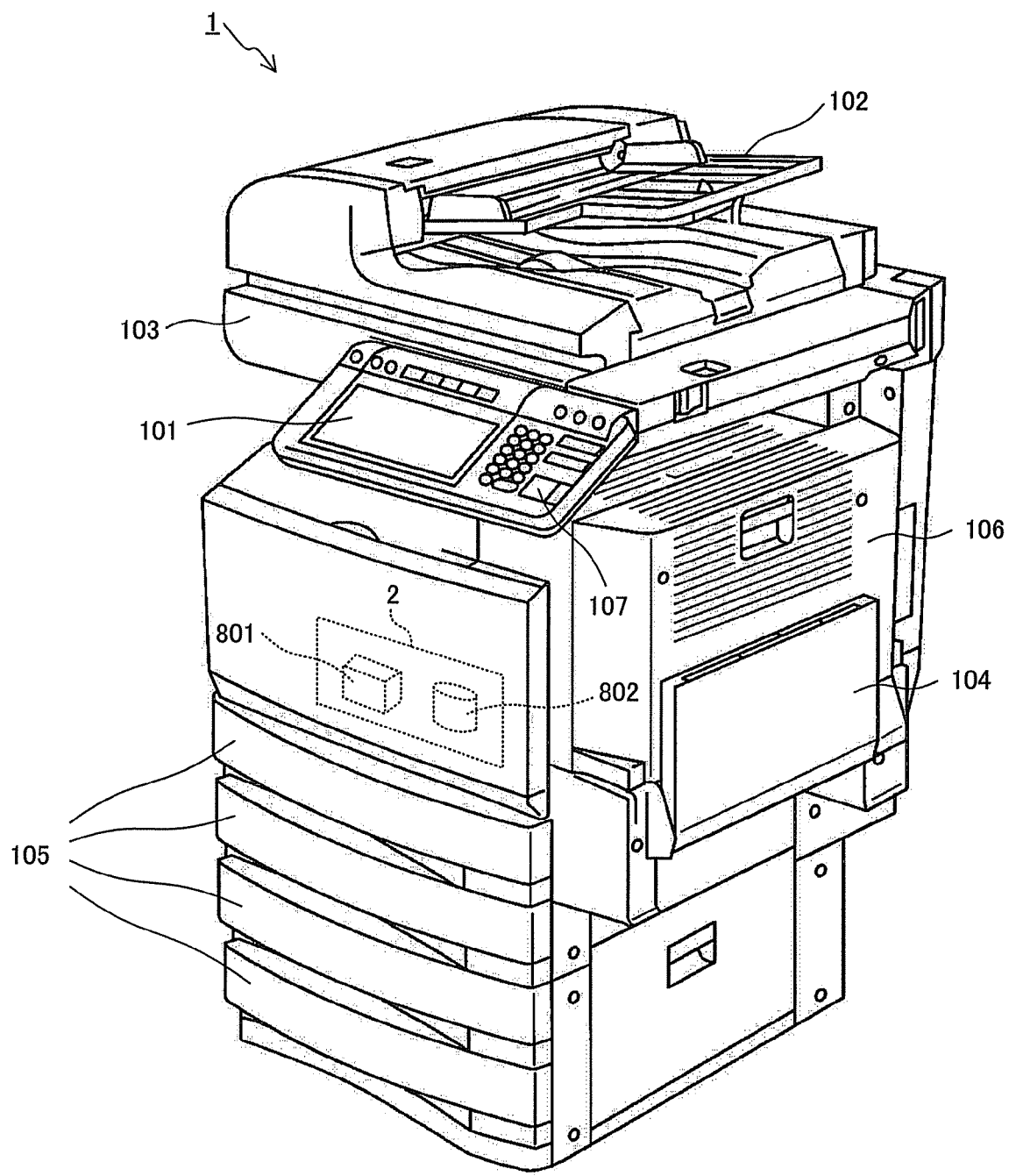
FIG. 1 is a perspective view showing the outer appearance of an image processing apparatus 1 having a display control device 2 according to an embodiment of the present invention.

An embodiment of the present invention will be described, with reference to the accompanying drawings. FIG. 1 is a perspective view explaining the outline of an image processing apparatus 1 having a display control device 2 according to an embodiment of this invention. The image processing apparatus 1 is, for example, a multi function peripheral (MFP).

The image processing apparatus 1 according to the present embodiment comprises an interface screen 101, an auto document feeder (ADF) 102, an image-reading unit 103, a manual sheet-feeding unit 104, a sheet cassette 105, an image-forming unit 106, an authentication process unit 107, and a display control device 2.

How the image processing apparatus 1 operates will be briefly explained with reference to the accompanying drawings. Assume that image processing apparatus 1 is set in copy mode (to perform a prescribed image processing). First, the authentication process unit 107 authenticates the user. If authenticated, the user touches the interface screen 101, inputting operation instructions. In accordance with the instructions, the original document placed on the ADF 102 is automatically transported to the image-reading position. At the image-reading position, the image-reading unit 103 reads images from the original document. Meanwhile, a paper sheet is fed to the image-forming unit 106 (i.e., an image-processing unit) from either the sheet cassette 105 or the manual sheet-feeding unit 104, in accordance with the instructions input at the interface screen 101. The image-forming unit 106 forms an image on the sheet in accordance with the image read by the image-reading unit 103. The document is thereby copied.

The interface screen 101 comprises, for example, a touch panel display. The panel 101 functions as an operation input unit that receives the operation instructions the user has input by touching the icons displayed on the interface screen 101.

The display control device 2 will be described in detail. The display control device 2 has the function of displaying, on the interface screen 101, display objects such as characters and icons, which are related to different process modes in which the image processing apparatus 1 can operate. Here, the "characters" include symbols, and the "icons" include figures. With the display control device according to the present embodiment, display objects, each consisting of characters, or an icon, or both characters and an icon, can be displayed. For simplicity of description, however, the display objects will be referred to, generally as "icons," in the following description. The objects to undergo the above-mentioned processes in the image processing apparatus 1 are, for example, original document sheets, originals in the form of books, image information, and the like.

Figure 2:
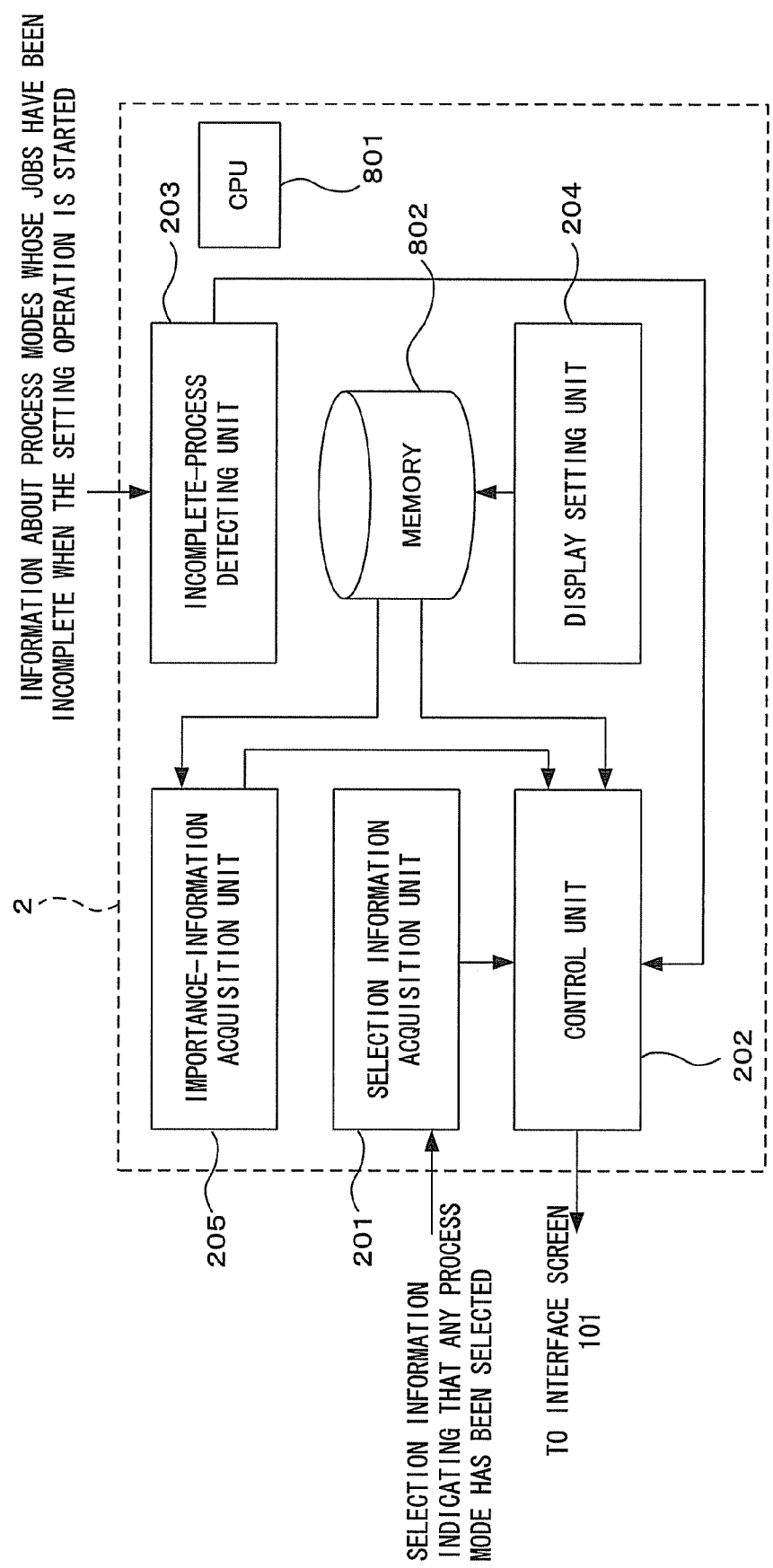
FIG. 2 is a functional block diagram explaining the display control device 2 according to the embodiment.

FIG. 2 is a functional block diagram explaining the display control device 2 according to this embodiment. The display control device 2 according to this embodiment comprises a selection information acquisition unit (selection information acquisition means) 201, a control unit (control means) 202, an incomplete-process detection unit (incomplete-process detection means) 203, a display setting unit (display setting means) 204, an importance-information acquisition unit (importance-information acquisition means) 205, a CPU 801, and a memory 802.

The image processing apparatus 1 has a plurality of process modes, such as "copy," "send," "favorites," "scan preview," "print," "save" and "box." To select any desired one of the process modes described above, the user selects that one of the icons 601 to 607 shown on the main menu (see FIG. 3) displayed on the interface screen 101, which corresponds to the desired process mode. The user selects the icon by, for example, touching the icon on the interface screen 101. The selection information acquisition unit 201 acquires the selection information that represents the process mode thus selected, in accordance with which icon the user has selected on the interface screen 101. It will be explained how the information displayed changes on the interface screen 101 when the user selects the icon 601, i.e., copy-mode icon.

Figure 3:
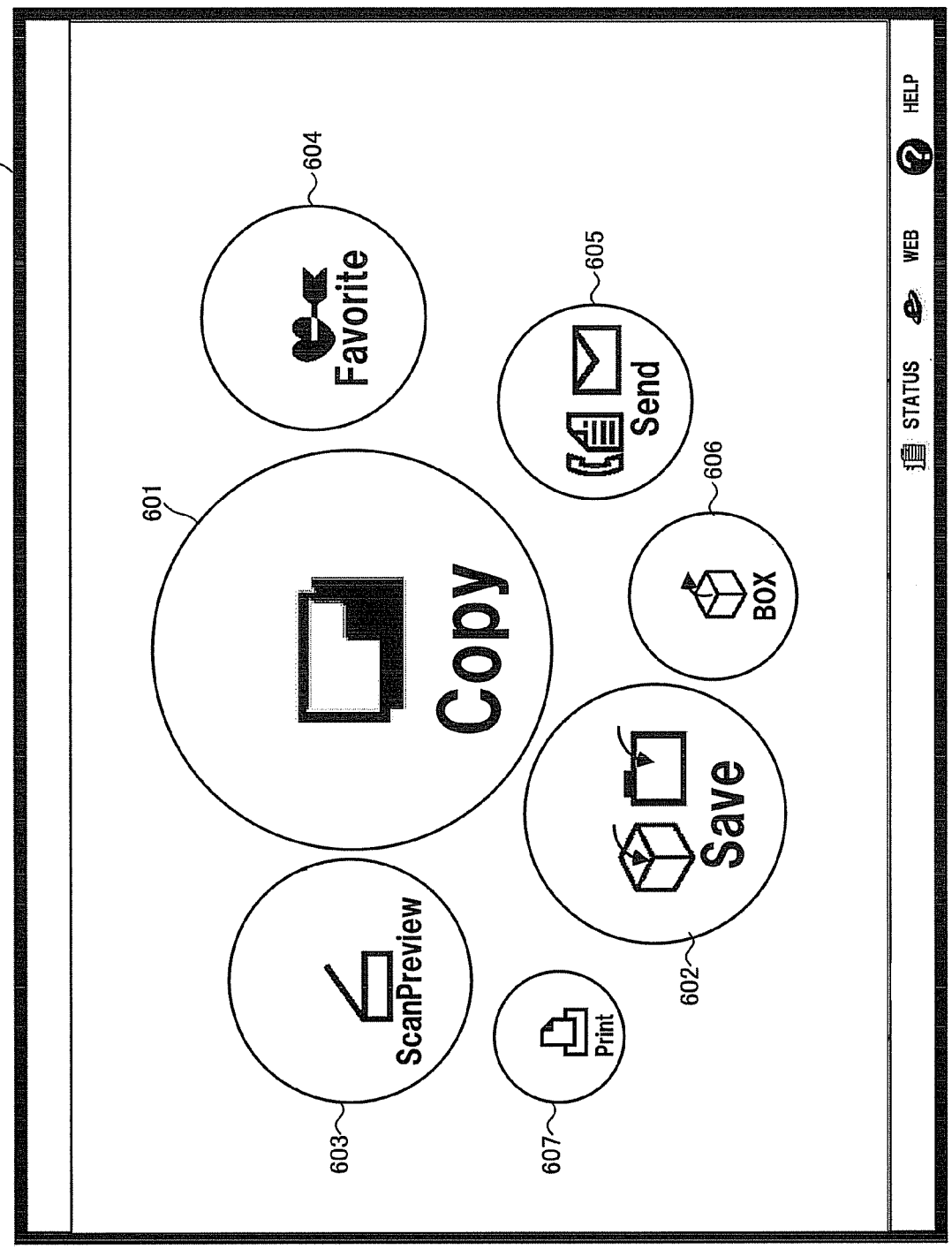
FIG. 3 is a diagram depicting the main menu displayed on the interface screen 101.
Figure 4:
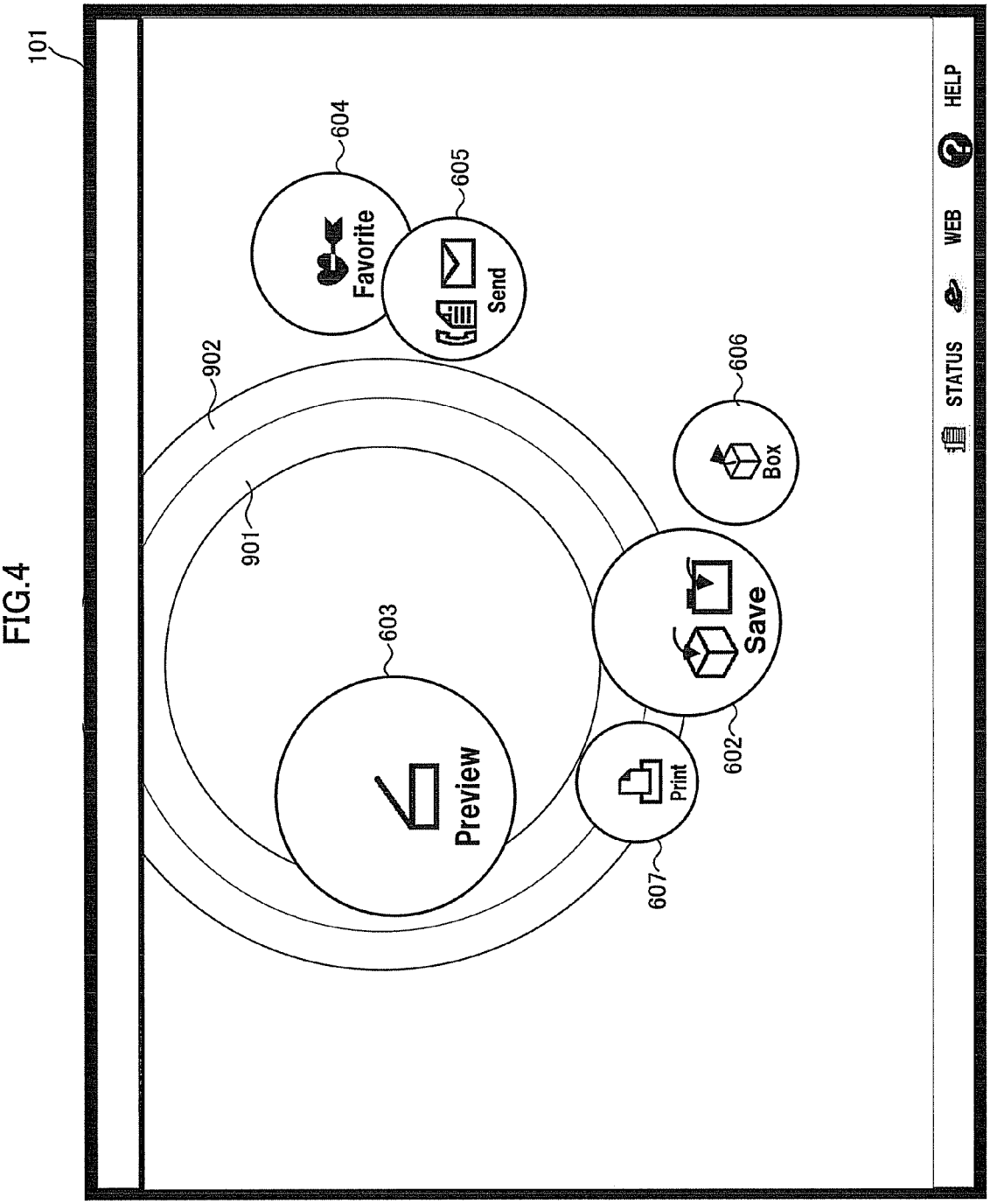
FIG. 4 is a diagram showing how icons move until the menu is switched to a copy-mode setting menu after the copy-mode icon has been selected in the main menu shown in FIG. 3.
Figure 5:
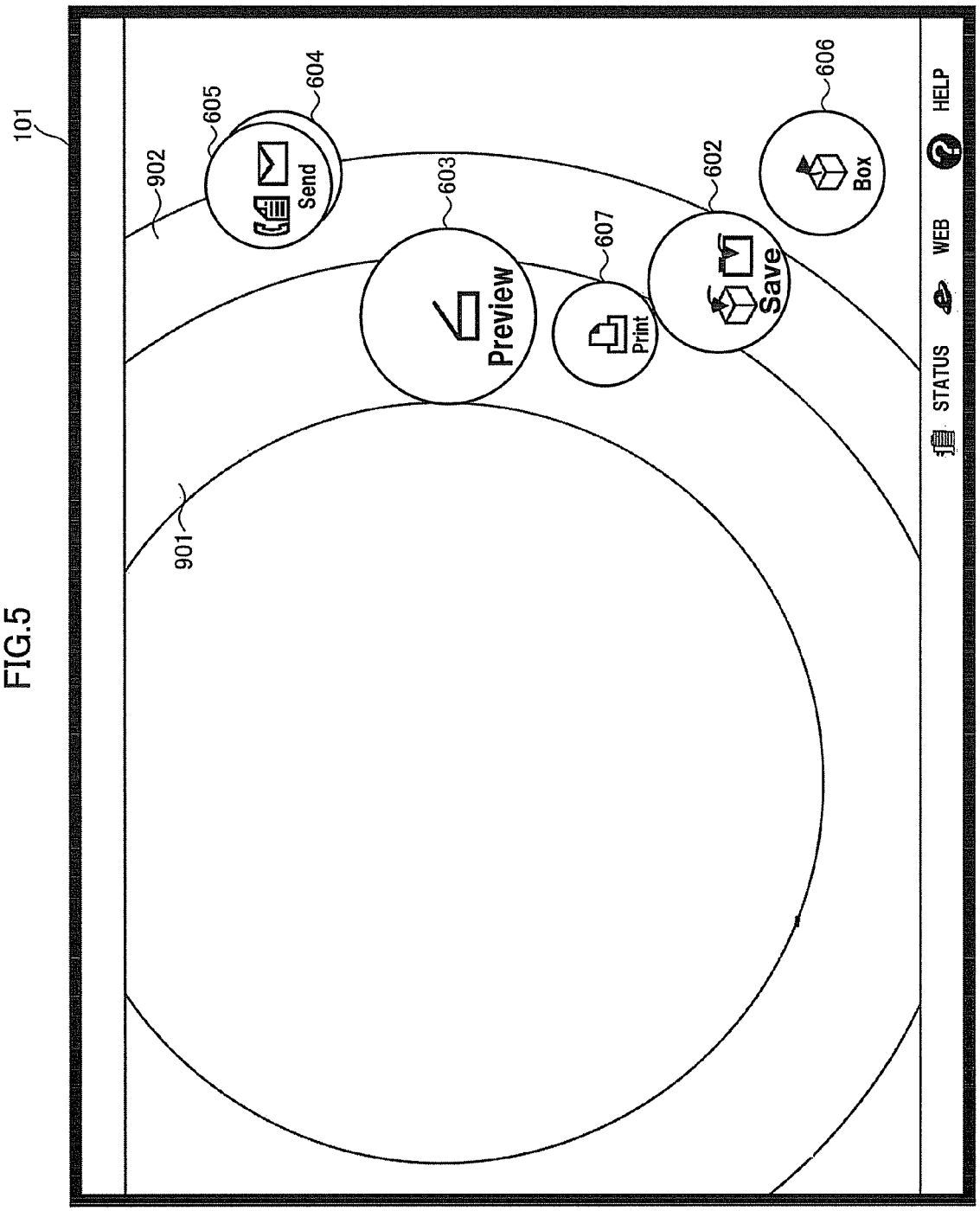
FIG. 5 is a diagram showing how icons move until the menu is switched to a copy-mode setting menu after the copy-mode icon has been selected in the main menu shown in FIG. 3.
Figure 6:
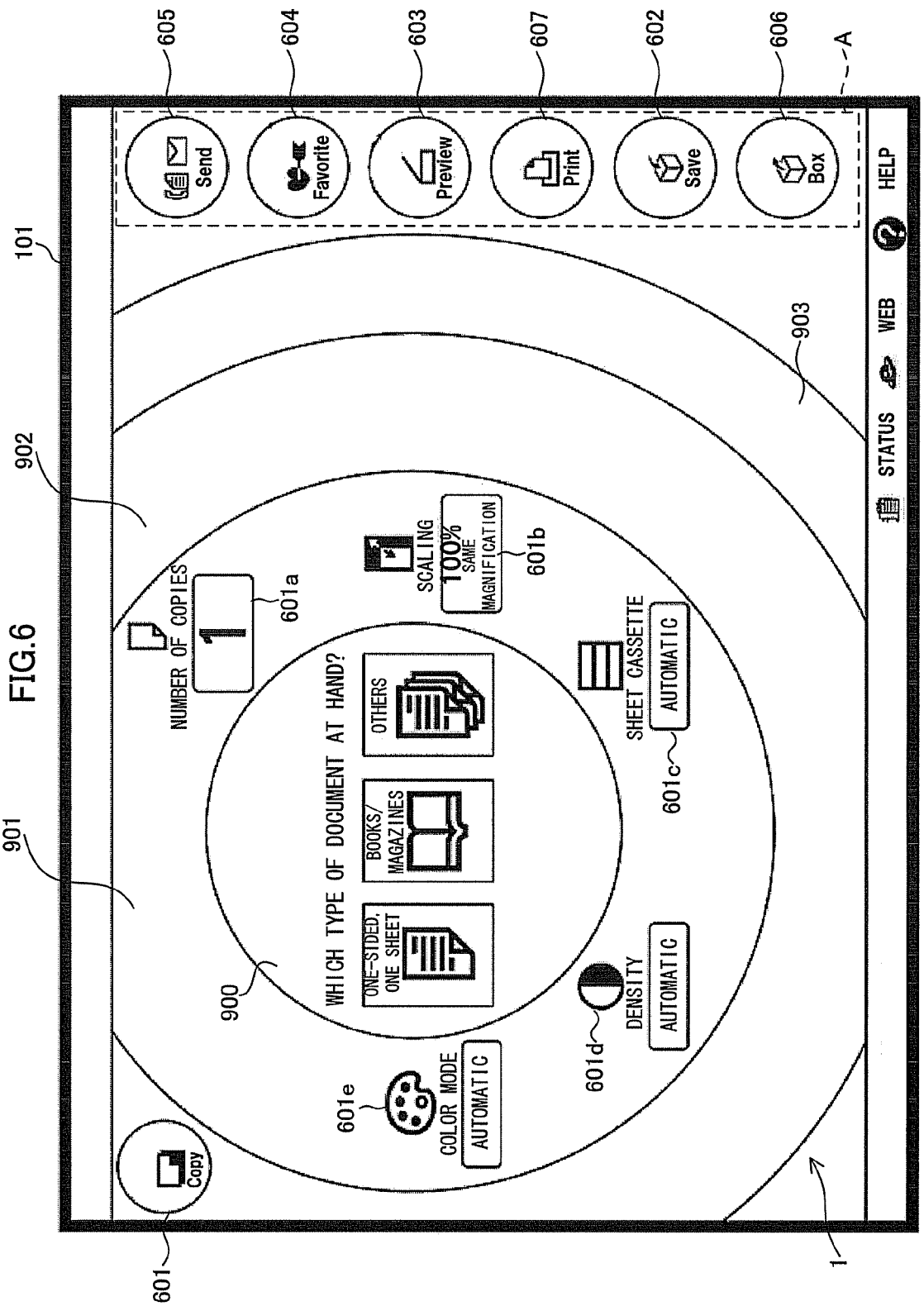
FIG. 6 is a diagram showing how icons move until the menu is switched to a copy-mode setting menu after the copy-mode icon has been selected in the main menu shown in FIG. 3.

FIGS. 4 to 6 are diagrams illustrating how the icons move on the screen until the menu is switched to a copy-mode setting menu that the user uses to make various copy-mode settings, after the copy-mode icon 601 has been selected in the main menu of FIG. 3.

In accordance with the basis of the information acquired by the selection information acquisition unit 201, the control unit 202 displays, in the first display region A1, the icons corresponding to the set items related to the process mode selected (i.e., copy mode). At the same time, the control unit 202 displays the icons 602 to 607 corresponding to the process modes not selected, in the second display region A2 that is narrower than the first display region A1 (see FIG. 6). At this time, the control unit 202 moves the icons from the positions shown in FIG. 3 to the positions shown in FIG. 6, on the main menu.

Thus, the setting items about the process mode the user has selected from various ones (i.e., process mode the user is interested in) are magnified and displayed in a broad region on the display panel 101, while the icons of the other process modes (not selected) are reduced in size and displayed in the narrow region. Therefore, the user can always see the icons corresponding to all process modes. Since the items about the process mode the user has selected are displayed in magnified size, he or she can easily grasp which process mode he or she has selected. This greatly facilitates the user's operation even if the user uses the image processing apparatus 1 in several modes, one after another.

The control unit 202 displays, on the screen, the first display region A1 on the left side of the second display region A2, above the second display region A2, or on the left and above the second display region A2. There is a general principle that is observed in designing user interfaces. That is, the important items are arranged on the left part of the screen or in the upper part thereof, while the items not so important are arranged on the right part of the screen or in the lower part thereof. It is therefore desired that display objects be arranged on the screen in accordance with the general design principle. More precisely, the first display region A1 is located on the left of the second display region A2, above the second display region A2, or at an upper-left position with respect to the second display region A2. Thus, the icons important for the user (i.e., the icons corresponding to the process mode the user has selected) are displayed on the left to the center of the screen, above the center of the screen, or on the left to and above the center of the screen. Therefore, the icons can be arranged in a manner that accords with the general design principle (i.e., manner natural to the user). This helps to facilitate the user's operation.

The control unit 202 displays the fist display region A1 on the left to the center of the screen, above the center of the screen, or on the left to and above the center of the screen. The first display region A1 may be closer to the left side of the screen than to the center thereof if the screen is long sideways, and may be closer to the upper side of the screen than the center thereof if the screen is longer than it is wide. Then, the setting items about the process mode the user has selected can be arranged at the positions that represent the importance of the items (that is, in accordance with the general principal of designing interfaces). If the screen is rectangular, the first display region A1 may be arranged at one side in the lengthwise direction of the screen. In this case, the second display region A2 can acquire a larger size than otherwise and arranged at the other side in the lengthwise direction. Thus, more items can be displayed in second display region A2.

In this embodiment, the first display region A1 is composed of first to n-th regions (n is 2 or a greater integer) that are ring-shaped and concentric to one another. Thus, the (x−1)th ring-shaped region (x is 2 or a greater integer) is located within the x-th ring-shaped region. More specifically, the first display region A1 is composed of first ring-shaped region 901 to third ring-shaped region 903 and a region 900 lying in the first ring-shaped region 901. The first ring-shaped region 901 is located inside the second ring-shaped region 902, which in turn is located inside the third ring-shaped region 903.

The importance-information acquisition unit 205 is designed to acquire, from the memory 802, information items representing the importance degrees of the icons to display in the first display region A1. The control unit 202 displays an icon of the icons that are to be displayed in the first display region A1, which is more important than the icon displayed in the x-th region, in the (x−1)th region. FIG. 7 is a table that shows the degrees of importance assigned to the icons that are to be displayed in the first display region A1 when the copy mode is selected. The "importance" is based on the frequency at which icon was selected in the past one month.

The control unit 202 displays icons in each ring-shaped region in a specific manner. That is, the more important each icon is, the more upstream it is displayed in the clockwise direction with respect to a certain position above the center of the region. Thus, the icons are arranged in the clockwise direction, in the descending order of importance. This more attracts the user's attention to important icons than to the other icons, because of the human behavior of looking at objects in the clockwise direction if they are arranged in a circle. Further, the control unit 202 may display the icons in the clockwise direction at regular intervals, in the ring-shaped regions from that position above the center of the region.

Moreover, the control unit 202 can display the icons in a specific manner. Of the icons displayed in the second display region A2, the icons corresponding to one of the process modes, which is related to the process mode corresponding to the icons displayed in the first display region A1, can be displayed more emphatically than the icons of the process modes displayed in the second display region A2. More precisely, the control unit 202 changes at least one of the items selected from the group of consisting of the names of icons, the characters included in icons, the font of characters, the thickness of character strokes, the inclination of characters, the shape of icons, the thickness of lines, the luminance of icons, the sizes of icons, the motion of icons, the saturation of icons, and the contrast of icons to the background (thus changing the condition in which characters or figures are displayed). The term "mode related to the process mode corresponding to the icons displayed in the first display region A1" may be a process mode that the user has selected at his or her discretion. Alternatively, it may be any process mode the user can select, if the process mode the user can select next to the process modes displayed in the first display region A1 is limited in numbers.

Figure 8:
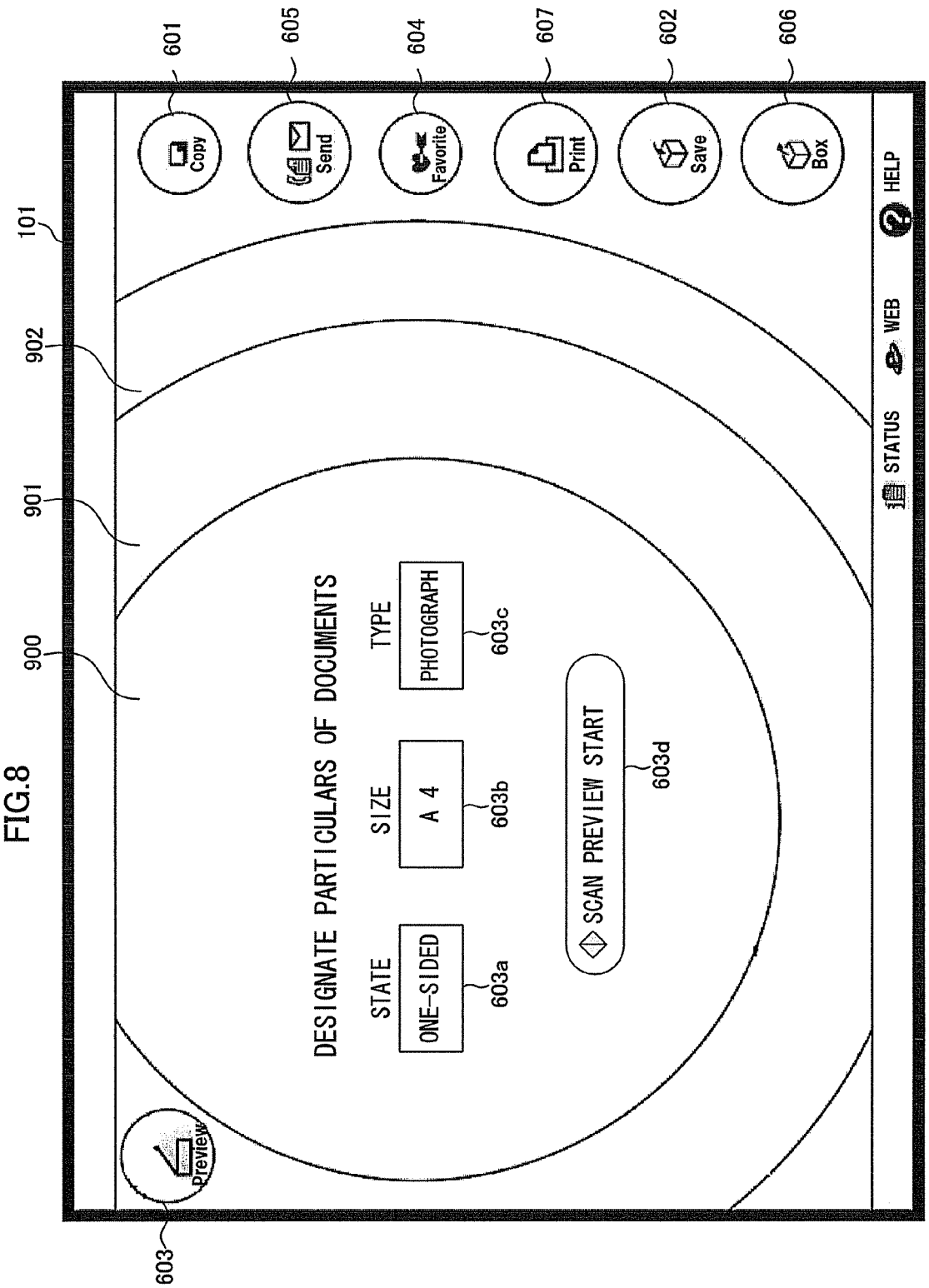
FIG. 8 is a diagram illustrating an example of an interface screen that the control unit displays when the user selects the scan-preview mode on the main menu.

FIG. 8 is a diagram illustrating an example of an interface screen 101 that the control unit 202 displays when the user selects the icon 603 that corresponds to the scan-preview mode on the main menu shown in FIG. 3. In the example shown in this figure, the icons 605, 607 and 602 that of the "send mode," "print mode," and "save mode," respectively, which can be selected next to the scan-review mode (i.e., process modes in which the results of the scan preview mode can be utilized), and the icon 606 of the "box mode" that the user has selected as a mode related to the scan preview mode are displayed in a size larger than the other icons. As shown in FIG. 8, button icons 603a to 603d are displayed in the innermost region 900 of the first ring-shaped region 901. The icon 603a is "document set" icon, the icon 603b is "document-size" icon, which may be selected to designate the size of the document, and the icon 603c is "document-type" icon, which may be selected to designate the type of the document. The icon 603d is "scan-review start" icon, which may be selected to start the scan preview process.

Further, the control unit 202 can display the icons in another manner. Of the icons displayed in the second display region A2, the icons corresponding to one of the process modes, which is frequently selected after any one of the process modes corresponding to the icons displayed in the first display region A1, can be displayed more emphatically than the icons of the other process modes. That is, the more frequently a process mode is expected to be selected next to any process mode displayed in the first display region A1, based on the operation history, the more emphatically the icon corresponding to the process mode will be displayed. This makes it easy for the user to recognize the icon of the process mode that he or she will select next, and ultimately enhance the operability of the image processing apparatus 1.

Figure 10:
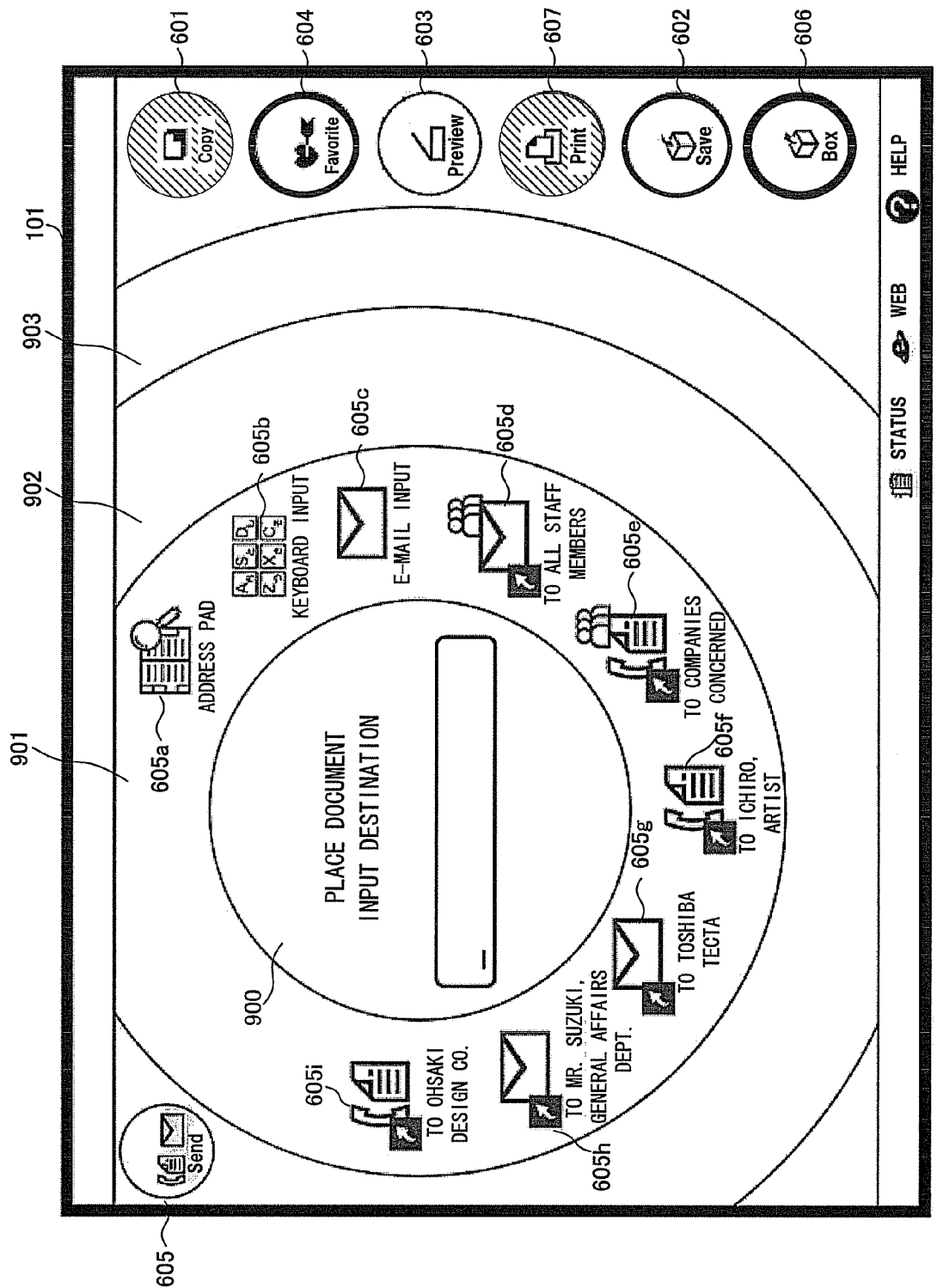
FIG. 10 is a diagram illustrating an example of an interface screen that the control unit displays when the user selects the send mode on the main menu.

FIG. 9 is a table showing the frequencies at which process modes have been selected after the "send mode" has been selected. FIG. 10 is a diagram illustrating an example of an interface screen 101 that the control unit 202 displays when the user selects the icon 605 of the send mode in the main menu of FIG. 3. As shown in FIG. 10, the more frequently a process mode has been selected after the "send mode," the thicker the contour of the corresponding icon is. The icon is thereby emphasized. In this embodiment, all icons need not be emphasized to different degrees gradually changed, nonetheless. Instead, only three icons, for example, which correspond to the three process modes more frequently selected, may be emphatically displayed in the same manner.

Moreover, the control unit 202 can display the icons in the following manner. Of the icons displayed in the second display region A2, the icons corresponding to one of the process modes, which is frequently selected after any one of the process modes corresponding to the icons displayed in the first display region A1, can be displayed in the upper or left part of the second display region A2. That is, the more frequently a process mode is expected to be selected next to any process mode displayed in the first display region A1, based on the operation history, the higher position or the more leftward position the icon corresponding to the process mode will be assumed in the second display region A2. This accords with the above-mentioned principle of designing user interfaces. Thus, the more likely an icon is selected, the more attention it attracts from the user. This makes it easy for the user to recognize the icon of the process mode that he or she may select next, and ultimately enhance the operability of the apparatus 1.

The incomplete-process detection unit 203 detects any process mode corresponding to the icons displayed in the second display region A2, whose jobs have been started but not completed. "Any process mode whose job has been started but not completed" is a "process mode being set" or a "process mode the job of which is being performed," or both.

The control unit 202 emphatically displays, in the second display region A2, the icon that corresponds to the process mode that has been detected by the incomplete-process detection unit 203 as one whose job has not been completed yet. The control unit 202 displays the icon corresponding to the process mode in which a job is proceeding, more conspicuously than the icon corresponding to a process mode being set. The interface screen 101 of FIG. 10 indicates that the job of the copy mode and the print mode is proceeding and being set, respectively, while the send mode is being set. In this case, the icon corresponding to the copy mode whose job is proceeding is blinking at a predetermined time intervals, and the icon corresponding to the print mode is blinking at longer time intervals than the icon corresponding to the copy mode. (In FIG. 10, any icon blinking is shaded.) Thus, while the apparatus 1 are performing two or more tasks, that is, while jobs of a plurality of process modes are proceeding, the icons of these modes, some being set and the others being performed, are displayed in different manners. The user can therefore know for sure which mode is being performed and which mode is being set, even if the operating mode of the apparatus 1 is switched from one to another.

The display setting unit 204 sets the position that any icon should take in the second display region A2, in accordance with the information the user has input on the interface screen 101. The control unit 202 acquires, from the memory 802, the information representing the position the display setting unit 204 has set by the display setting unit 204. Then, the control unit 202 displays the icon whose position has been set, at the position thus set in the second display region A2. In this instance, the positions of icons are set in accordance with the information input by the user. In addition, the display setting unit can set, if necessary, the method of displaying icons in emphasized form.

The control unit 202 moves any icon that is now displayed in the second display region A2 but should be displayed in the first display region A1, from a position in the second display region A2 toward the first display region A1.

The CPU 801 has a role of performing various processes in the image processing apparatus 1 and the display control device 2. The CPU 801 has another role of executing the programs stored in the memory 802, thereby making the image processing apparatus 1 perform various functions. The memory 802 is constituted by, for example, a ROM, a RAM, and the like. It has the role of storing various information items and programs that are used in the image processing apparatus 1 and the display control device 2.

The ring-shaped regions constituting the above-mentioned first display region A1 need not be shaped like a perfect ring. They may instead be of a shape with a missing part (i.e., substantially ring-shaped). In other words, they suffice to have such a shape as one surrounds the immediately inner ring-shaped region, so that the user may recognize which region is inside any other. The user can know the importance of each icon from the radius of the ring-shaped region in which the icon is displayed, the radius being a distance from the center of the innermost region. Moreover, more icons can be displayed than tabs or tree-hierarchal items in each ring-shape region. In view of this, it is desirable that the regions be shaped like a ring. Nevertheless, the regions are not limited to ring-shaped ones. For example, they may be ring-shaped and have a polygonal contour. Further, the adjacent ring-shaped regions need not be similar in contour. They may rather have different contours.

Figure 11:
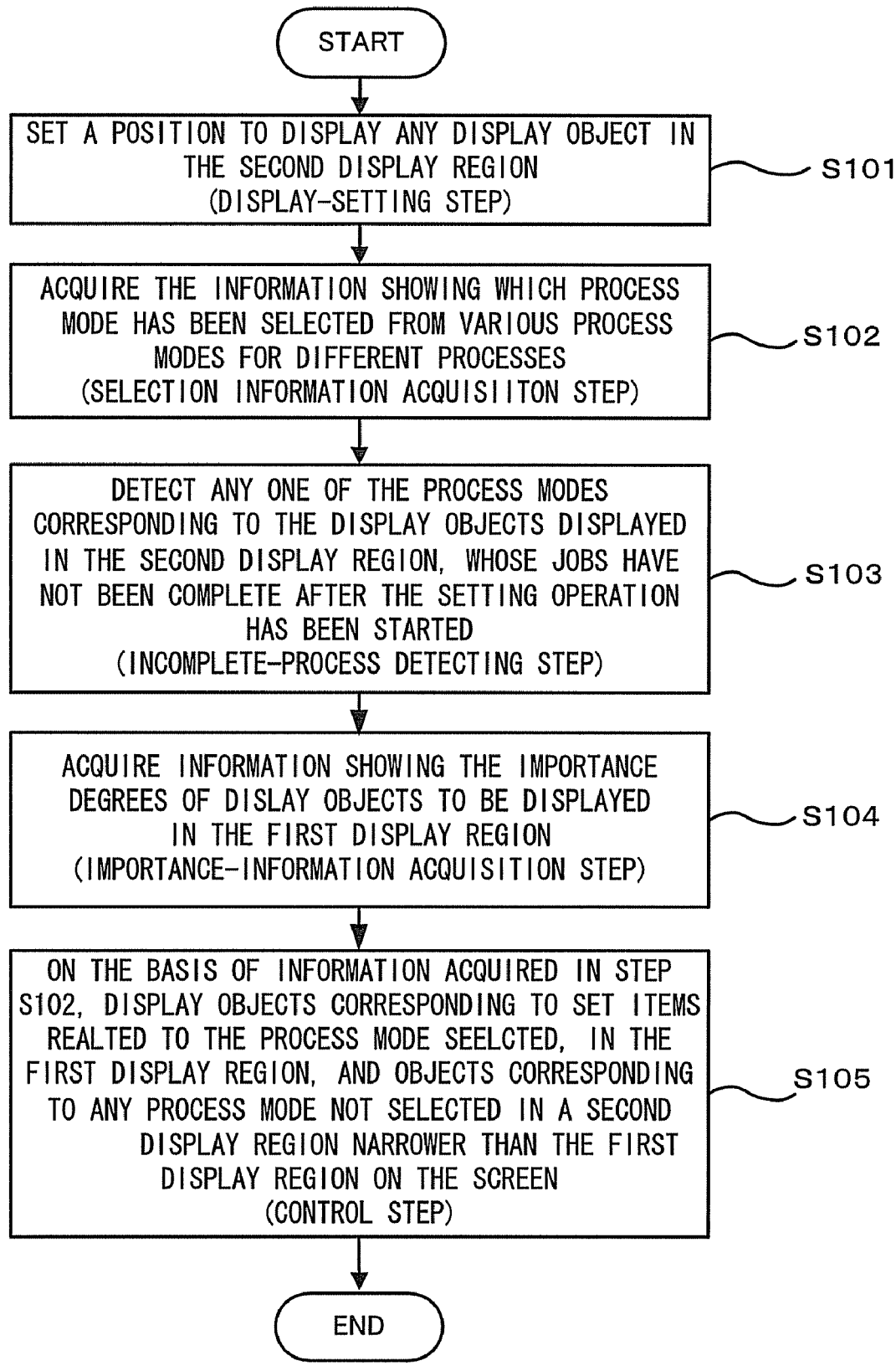
FIG. 11 is a flowchart explaining a process (display control method) performed by the display control device 2 according to the embodiment.

FIG. 11 is a flowchart explaining a process (display control method) performed by the display control device 2 according to the present embodiment.

The display setting unit 204 sets a position at which any display object should be displayed in the second display region (display-setting step) (S101).

The selection information acquisition unit 201 acquires the information representing which process mode has been selected from different process modes (selection information acquisition step) (S102).

The incomplete-process detection unit 203 detects any one of the process modes corresponding to the display objects displayed in the second display region, whose jobs have not been completed after the setting step has been started (incomplete-process detecting step) (S103).

The importance-information acquisition unit 205 acquires information items representing the importance degrees of the display objects to be displayed in the first display region (importance-information acquisition step) (S104).

On the basis of the information items acquired in the selection-information acquisition step, the control unit 202 displays display objects corresponding to set items related to the process mode selected, in a first display region on a screen, and display objects corresponding to any process mode not selected, in a second display region narrower than the first display region on the screen (control step) (S105).

In the control step, the first display region is displayed in a region on the left side of the second display region or in a region above the second display region, or both on the left side and in the region above, and also on the left side of the center or in a region above the center, or no both on the left side and in the region above.

In the control step, too, of the display objects corresponding to process modes displayed in the second display region, the display objects related to any process mode corresponding to the display objects displayed in the first display region are more emphatically displayed than the display objects corresponding to any other process modes displayed in the second display region. Also in the control step, of the display objects corresponding to process modes displayed in the second display region, the display objects corresponding to any process mode that is frequently selected next to the process mode corresponding to the display objects displayed in the first display region are more emphatically displayed than the display objects corresponding to any other process modes displayed in the second display region.

In the control step, of the display objects corresponding to process modes displayed in the second display region, the display objects corresponding to any process mode that is frequently selected next to the process mode corresponding to the display objects displayed in the first display region are display information position above or on the left of the items corresponding to any other process modes displayed in the second display region.

In the control step, too, the control unit emphatically displays, in the second display region, the display objects corresponding to any process mode whose job have been detected as not completed in the incomplete-process detecting step. The phrase "process mode whose job has been started but not completed" means a process mode being set or a process mode whose jobs are being performed, or both. In the control step, the display objects corresponding to the process mode whose job is being performed are displayed more emphatically than the display objects that correspond to the process mode that is being set.

In the control step, any display object that is now displayed in the second display region but should be displayed in the first display region is moved from a position in the second display region toward the first display region.

Also in the control step, of the display objects that are to be displayed in the first display region, those which are more important than the display objects displayed in the x-th ring-shaped region are displayed in the (x−1)th ring-shaped region. In the control step, too, any display object may be emphatically displayed by changing at least one of the display objects selected from the group of consisting of the font of characters, the thickness of character strokes, the inclination of characters, the shape of figure, the thickness of lines, luminance, sizes, motion, saturation, and contrast.

In the control step, any display object that should be displayed at a position set in the display-setting step is displayed at that position in the second display region.

As seen from the flowchart, the display-setting step is performed first. The method of controlling the display is not limited to this. It is sufficient if this step is performed before the control step. Further, any item set when a process mode is switched to another or set or when the display-setting step is performed can be used in the control step.

In the display control device, each step of the process performed is performed as the CPU 801 executes the display-control program stored in the memory 802.

In the present embodiment, the programs describing the functions of this invention are stored in the apparatus as described above. Alternatively, the programs may be downloaded into the apparatus via a network, or a recording medium storing the programs may be installed in the apparatus. The recording medium may be of any type, such as a CD-ROM, so long as it can store the programs and the programs can be read from it. The functions that can be implemented once installed or downloading into the apparatus may be of the type that cooperates with the operating system (OS) installed in the apparatus.

For the simplicity of explanation, the memory 802 has been described as having a storage area for the information set by the display setting unit 204 and a storage area for the information to be read by the control unit 202 and importance-information acquisition unit 205. (That is, the memory 802 stores all information required.) Nonetheless, these storage areas may be replaced by a database or the like that is arranged outside the image processing apparatus 1. In other words, the storage areas can be provided anywhere as long as the control unit 202, display setting unit 204 and importance-information acquisition unit 205 can exchange the information between them.

In the present embodiment, the image processing apparatus 1 is an MFP. Instead, the apparatus 1 can, of course, be applied to any other apparatuses such as a printer, a scanner, a personal computer (PC) and a multi-media kiosk (MMK), which perform image processing, such as image forming, imaging reading, image editing and imaging process.

The present invention has been described, with reference to a specific embodiment. Nevertheless, it will be obvious to those skilled in the art that various changes and modifications can be made without departing from the scope and spirit of the present invention.

As has been described in detail, the present invention can provide a technique that can help the user to know well that various process modes have been switched among them, thereby enabling the user to work more efficiently.

What is claimed is:

1. A display control device comprising:
   a selection information acquisition unit that acquires selection information representing which process mode has been selected from a plurality of process modes in which different processes are performed;
   a control unit that displays first display objects corresponding to set items related to the process mode selected, in a first display region on a screen, and second display objects corresponding to any process mode not selected, in a second display region narrower than the first display region on the screen, on the basis of the selection information acquired by the selection information acquisition unit;
   in which the first display region is composed of first to n-th substantially ring-shaped regions (n is 2 or a greater integer) that are concentric to one another, and the (x−1)th substantially ring-shaped region (x is 2 or a greater integer) is located within the x-th substantially ring-shaped region, which further comprises an importance-information acquisition unit that acquires information items representing the importance degrees of the first display objects to be displayed in the first display region, and in which the control unit displays first display objects, which are more important than the first display objects displayed in the x-th substantially ring-shaped region, in the (x−1)th substantially ring-shaped region; and
   at least one first display object for inputting operation instructions to designate the processing object in selected process mode is displayed in the innermost region of the first ring-shaped region.

2. The display control device according to claim 1, wherein, of the second display objects corresponding to process modes displayed in the second display region, the second display objects corresponding to any process mode related to any process mode corresponding to the first display objects displayed in the first display region are more emphatically displayed by the control unit than the second display objects corresponding to any other process modes displayed in the second display region.

3. The display control device according to claim 1, wherein, of the second display objects corresponding to process modes displayed in the second display region, the second display objects corresponding to any process mode that is frequently selected next to the process mode corresponding to the first display objects displayed in the first display region are more emphatically displayed by the control unit than the second display objects corresponding to any other process modes displayed in the second display region.

4. The display control device according to claim 1, wherein, of the second display objects corresponding to process modes displayed in the second display region, the second display objects corresponding to any process mode that is frequently selected next to the process mode corresponding to the first display objects displayed in the first display region are displayed by the control unit at a position above or on the left of the second display objects corresponding to any other process modes displayed in the second display region.

5. The display control device according to claim 1, which further comprises an incomplete-process detection unit that detects any one of the process modes corresponding to second display objects displayed in the second display region, whose jobs have not been completed after a setting operation has been started, and in which the control unit emphatically displays, in the second display region, the second display objects corresponding to any process mode whose job have been detected as not completed by the incomplete-process detection unit.

6. The display control device according to claim 5, wherein the process mode whose jobs have not been completed after a setting operation has been started is a process mode being set or a process mode whose jobs are being performed, or both.

7. The display control device according to claim 2, wherein the second display objects displayed include characters or icons, or both, and the control unit changes a state in which the characters or icons, or both, are displayed, thereby to emphatically display the display objects.

8. The display control device according to claim 1, which further comprises a display setting unit that sets a position at which any second display object is to be displayed in the second display region, and in which the control unit displays the second display object at the position set by the display setting unit.

9. An image processing apparatus comprising:
  a display control device;
  an operation input unit that receives operation instructions a user has input on the basis of the items displayed on the display control device; and
  an image-processing unit that performs an image processing in accordance with the operation instructions received by the operation input unit; and
  the display control device comprising:
  a selection information acquisition unit that acquires selection information representing which process mode has been selected from a plurality of process modes in which different processes are performed;
  a control unit that displays first display objects corresponding to set items related to the process mode selected, in a first display region on a screen, and second display objects corresponding to any process mode not selected, in a second display region narrower than the first display region on the screen, on the basis of the selection information acquired by the selection information acquisition unit;
  in which the first display region is composed of first to n-th substantially ring-shaped regions (n is 2 or a greater integer) that are concentric to one another, and the (x-1)th substantially ring-shaped region (x is 2 or a greater integer) is located within the x-th substantially ring-shaped region, which further comprises an importance-information acquisition unit that acquires information items representing the importance degrees of the first display objects to be displayed in the first display region, and in which the control unit displays first display objects, which are more important than the first display objects displayed in the x-th substantially ring-shaped region, in the (x-1)th substantially ring-shaped region; and
  at least one first display object for inputting operation instructions to designate the processing object in selected process mode is displayed in the innermost region of the first ring-shaped region.

10. A display control method for use in a display control device comprising:
  a selection information acquisition unit that acquires selection information representing which process mode has been selected from a plurality of process modes in which different processes are performed;
  a control unit that displays first display objects corresponding to set items related to the process mode selected, in a first display region on a screen, and second display objects corresponding to any process mode not selected, in a second display region narrower than the first display region on the screen, on the basis of the selection information acquired by the selection information acquisition unit;
  in which the first display region is composed of first to n-th substantially ring-shaped regions (n is 2 or a greater integer) that are concentric to one another, and the (x-1)th substantially ring-shaped region (x is 2 or a greater integer) is located within the x-th substantially ring-shaped region, which further comprises an importance-information acquisition unit that acquires information items representing the importance degrees of the first display objects to be displayed in the first display region, and in which the control unit displays first display objects, which are more important than the first display objects displayed in the x-th substantially ring-shaped region, in the (x-1)th substantially ring-shaped region; and
  at least one first display object for inputting operation instructions to designate the processing object in selected process mode is displayed in the innermost region of the first ring-shaped region,
  the display control method comprising:
  acquiring selection information representing which process mode has been selected from a plurality of process modes in which different processes are performed; and
  controlling the control unit to display, in a first display region on a screen, first display objects corresponding to set items related to the process mode selected, and, in a second display region narrower than the first display region on the screen, second display objects corresponding to any process mode not selected, on the basis of the selection information acquired by the selection information acquisition unit.

11. The display control method according to claim 10, wherein, of the second display objects corresponding to process modes displayed in the second display region, the second display objects corresponding to any process mode related to any process mode corresponding to the first display objects displayed in the first display region are more emphatically displayed than the second display objects corresponding to any other process modes displayed in the second display region.

12. The display control method according to claim 10, wherein, of the second display objects corresponding to process modes displayed in the second display region, the second display objects corresponding to any process mode that is frequently selected next to the process mode corresponding to the first display objects displayed in the first display region are more emphatically displayed.

13. The display control method according to claim 10, wherein, of the second display objects corresponding to process modes displayed in the second display region, the second display objects corresponding to any process mode that is frequently selected next to the process mode corresponding to the first display objects displayed in the first display region are displayed at a position above or on the left of the second display objects corresponding to any other process modes displayed in the second display region.

14. The display control method according to claim 10, which further comprises detecting any one of the process modes displayed in the second display region, whose jobs have not been completed after a setting operation has been started, and in which, in controlling the control unit, the second display objects corresponding to any process mode whose jobs have been detected as not completed by the incomplete-process detection unit are emphatically displayed in the second display region.

15. The display control method according to claim 14, wherein the process mode whose jobs have not been completed after a setting operation has been started is a process mode being set or a process mode whose jobs are being performed, or both.

16. The display control method according to claim 10, in which the first display region is composed of first to n-th substantially ring-shaped regions (n is 2 or a greater integer) that are concentric to one another, and the (x−1)th substantially ring-shaped region (x is 2 or a greater integer) is located within the x-th substantially ring-shaped region, which further comprises acquiring information items representing the importance degrees of the first display objects to be displayed in the first display region, and in which the first display objects more important than the display objects displayed in the x-th substantially ring-shaped region are displayed in the (x−1)th substantially ring-shaped region, in controlling the control unit.

17. The display control method according to claim 11, wherein the first display objects displayed include characters or icons, or both, and a state in which the characters or icons, or both, are displayed is changed in controlling the control unit, thereby to emphatically display the first display objects.

18. The display control method according to claim 10, which further comprises setting a position at which any second display object is to be displayed in the second display region, and in which the second display object is displayed, in controlling the control unit, at the position set by the display setting unit.

19. A display control device comprising:
selection information acquisition means for acquiring selection information representing which process mode has been selected from a plurality of process modes in which different processes are performed;
control means for displaying first display objects corresponding to set items related to the process mode selected, in a first display region on a screen, and second display objects corresponding to any process mode not selected, in a second display region narrower than the first display region on the screen, on the basis of the selection information acquired by the selection information acquisition means;
an importance-information acquisition means for acquiring information items representing importance degrees of the first display objects to be displayed in the first display region;
in which the first display region is composed of first to n-th substantially ring-shaped regions (n is 2 or a greater integer) that are concentric to one another, and the (x−1)th substantially ring-shaped region (x is 2 or a greater integer) is located within the x-th substantially ring-shaped region,
in which the control means for displaying display objects, which are more important than the first display objects displayed in the x-th substantially ring-shaped region, in the (x−1)th substantially ring-shaped region; and
at least one first display object for inputting operation instructions to designate the processing object in selected process mode is displayed in the innermost region of the first ring-shaped region.

* * * * *